3,410,784
APPARATUS FOR PERFORMING
ELECTROLYTIC PROCESSES
Richard Mark Orpen Maunsell, Pyrford, and Lloyd Graham Hanlon, Birmingham, England, assignors to Electric Reduction Company of Canada, Ltd., Toronto, Ontario, Canada, a corporation of Canada
Filed June 16, 1965, Ser. No. 464,332
Claims priority, application Great Britain, Oct. 12, 1964, 41,636/64
7 Claims. (Cl. 204—268)

ABSTRACT OF THE DISCLOSURE

Apparatus for performing electrolytic processes wherein a corrosive oxidizing agent and nascent hydrogen are released at an anode and cathode respectively of the type which comprises a series of unit cells, terminal electrodes in first and last cells of the series, electrical connection between each unit cell and the next successive unit cell which consists in each case of one or more intermediate electrodes, each of which intermediate electrodes has a pair exposed in each of the two unit cells thereby connected, and means for applying a difference of electrical potential between the terminal electrodes in the first and last cells respectively; the improvement of so constructing each of the aforesaid intermediate electrodes and terminals electrodes that, when the terminal electrodes in the first cell are made anodic with respect to those in the last cell every anodic face is of platinized titanium and every cathodic face is of a metal which is resistant to corrosion by nascent hydrogen.

---

Figure 1:
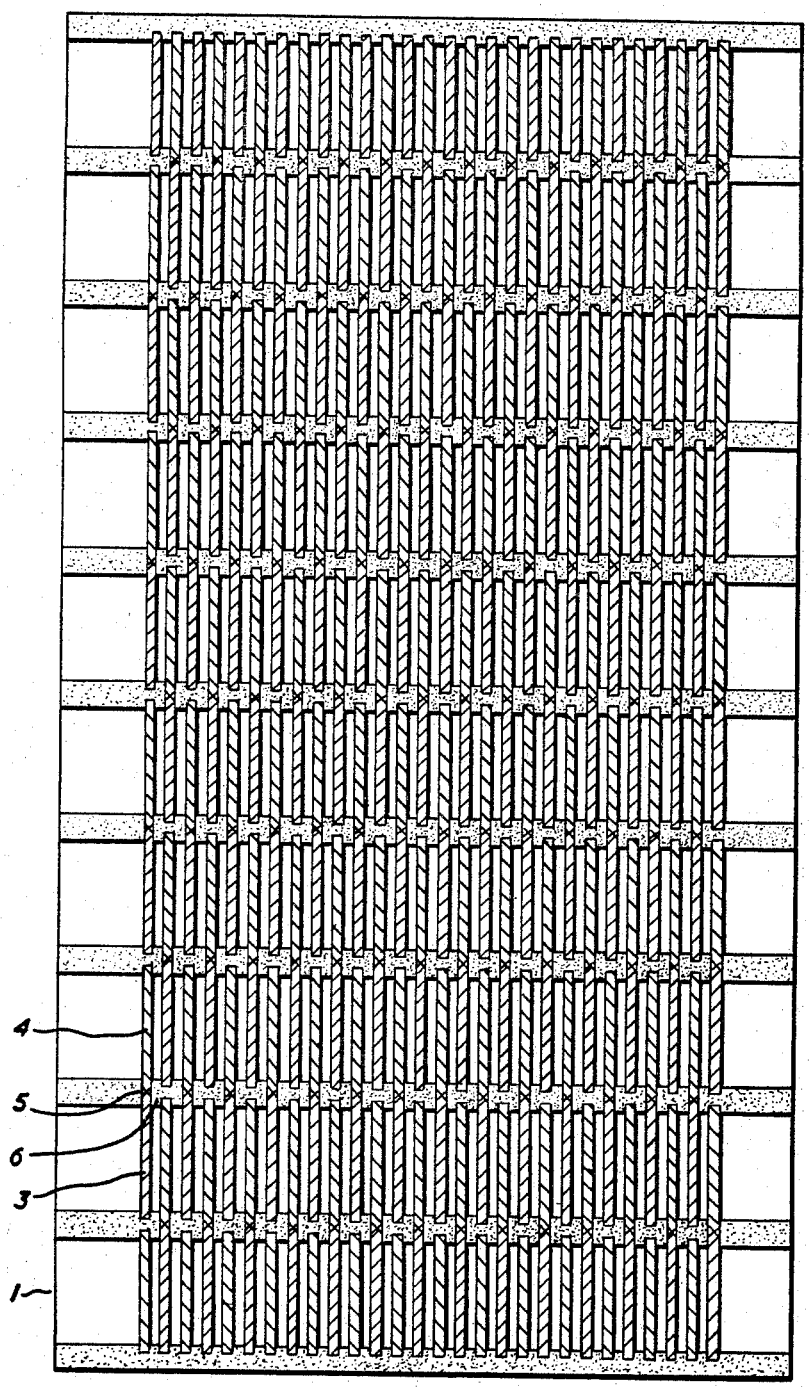

This invention relates to a method and apparatus for performing certain electrolytic processes, wherein a corrosive oxidising agent and nascent hydrogen are released at the anode and cathode respectively.

Examples of such processes include the electrolysis of brine, to form sodium hydroxide and chlorine in a cell wherein the electrodes are separated by a diaphragm, or to form sodium chlorate in a cell wherein the electrodes are not separated.

It is often desirable to connect a number of unit cells in series, and a problem with such electrolytic cells is to obtain a compact apparatus having a minimum of electrical connections. It is also desirable that such apparatus should be readily dismantled to assist in the overhaul and servicing. Apparatus hitherto used, for example in the manufacture of sodium chlorate, has consisted of a tank divided into unit cells by parallel sheets of graphite. When a difference of electric potential is applied between the graphite sheets at either end, current passes through the series, each intermediate graphite sheet functioning as a bipolar electrode, with one face serving as a cathode and the other as an anode in successive unit cells. A variation of this system has been proposed in U.S. patent specification No. 2,799,643 having in common with the above described cells the feature that current passes, between any two successive unit cells in the series, through an elecrode which is common to both unit cells.

Hitherto it has been common to use graphite in the construction of the electrodes of such cells. Graphite however, suffers from the disadvantage that it is consumed rapidly, even at low temperatures, and to prohibitive extent at high temperatures.

A solution to this problem would be to construct the electrodes of a metal which is not attacked by the products of electrolysis. However, such metals are normally too costly for industrial purposes. It has been proposed to employ platinised titanium in the construction of electrodes for this type of apparatus. In most instances however, graphite has been employed.

We have discovered that when the graphite electrodes in such cells are replaced by platinised titanium, contrary to general belief, the platinised titanium is rapidly corroded, wherever nascent hydrogen is being generated. However, we have discovered a method of constructing electrodes for such apparatus which overcomes this difficulty, and have devised particular apparatus suitable for processes such as the manufacture of sodium chlorate, wherein such electrodes may most advantageously be employed.

Our invention provides, in apparatus for performing electrolytic processes wherein a corrosive oxidising agent and nascent hydrogen are released at an anode and cathode respectively, of the type which comprises a series of unit cells, terminal electrodes in the first and last cells of the series, electrical connection between each unit cell and the next successive unit cell which consists in each case of one or more intermediate electrodes, each of which intermediate electrodes has a part exposed in each of the two unit cells thereby connected, and means for applying a difference of electric potential between the terminal electrodes in the first and last cells respectively; the improvement of so constructing each of the aforesaid intermediate electrodes and terminal electrodes that, when the terminal electrodes in the first cell are made anodic with respect to those of the last cell, every anodic face is of plainised titanium and every cathodic face is of a metal which is resistant to corrosion by nascent hydrogen, for example iron or copper.

A further aspect of our invention provides a cell arrangement in which the improvement described above can be used in the manufacture of sodium chlorate, and which comprises: an electrolyte chamber; a plurality of transverse non-permeable insulating partitions dividing the said chamber into a number of unit cells; a cathode arranged longitudinally in each cell, the said cathode consisting of a sheet of a metal which is resistant to corrosion by nascent hydrogen; an anode parallel and close to the cathode in each cell, the said anode consisting of a sheet plainised titanium, the cathode of each cell being substantially in line with the anode of each adjacent cell; means for supplying current to the anode of the first cell in the series and removing it from the cathode of the last cell in the series; electrical connection between the anode of each cell except the first and the cathode of the next preceding cell; and electrically insulating members separating the cathode of every cell except the first from the anode of the next preceding cell.

If desired, the battery of cells in series just described may be extended to form a battery of greater amperage by extending the vessel in the transverse direction, extending each insulating partition over the whole transverse dimension of the vessel, and repeating the two longitudinal lines of electrodes.

The electrical connections between pairs of electrodes as described above are preferably made by joining their abutting edges e.g. by welding, brazing, soldering or compressing or overlapping the edges. This joint is preferably located within the insulating partition.

Figure 2:
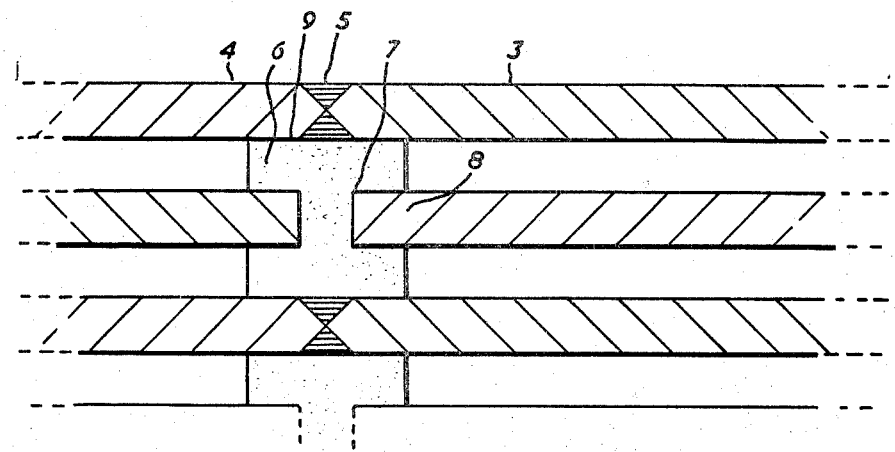
Figure 3:
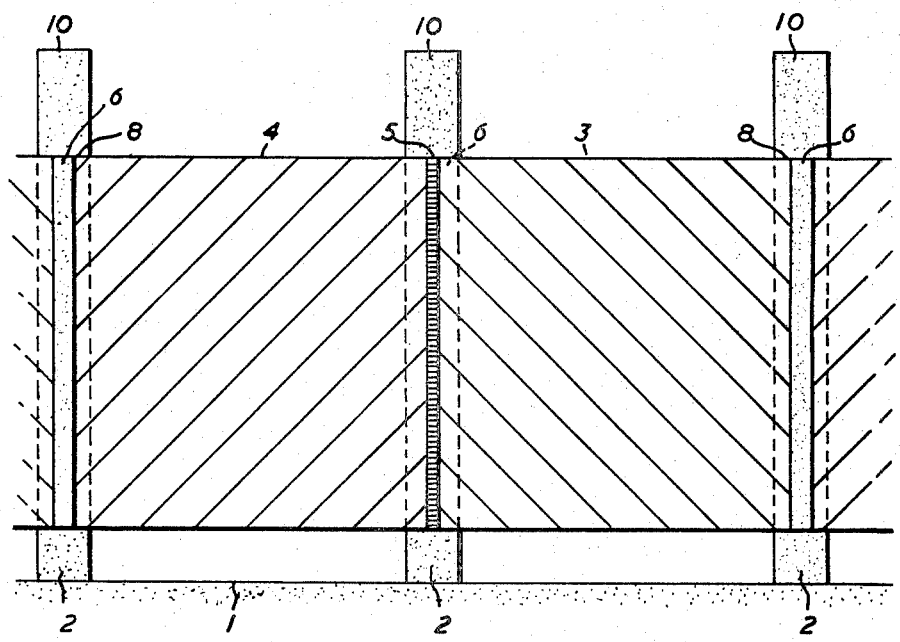

A preferred form of apparatus according to our invention will now be described, with reference to the accompanying drawings in which FIG. 1 is a plan view of the apparatus, FIG. 2 is a plan view of part of the apparatus, showing in more detail the arrangement of the electrodes and FIG. 3 is a longitudinal vertical section of part of the apparatus.

The apparatus comprises an electrolyte chamber 1, across the bottom of which extend a number of equally spaced, parallel, transverse ribs 2. Supported at their lower corners on the ribs 2, are a number of vertical, longitudinal, iron sheets 3, arranged alternately, both end-to-end and side-by-side, with a number of vertical, longitudinal platinised titanium sheets 4 which are similarly supported, to form spaced, parallel, longitudinal rows in which every platinised titanium sheet (which is not the first member of a row) is joined to the next preceding iron sheet in same row at their abutting edges 5, for example by silver soldering. Electrically insulating partitions 6, separate each iron sheet (which is not the first member of a row) from the next preceding platinised titanium sheet in the same row. The front and rear faces of each of these partitions are provided with vertical slots 7 into which the free ends, 8, of the separated sheets fit, and the lateral faces 9 bear against the joined ends 5 of laterally adjacent sheets, thereby enclosing the joint in a substantially water tight seal. Copper "bus bars" (not shown) are electrically connected to those metal sheets, at either end of the electrolyte chamber, which are not connected to any other sheet. It is also preferred that the apparatus should include transverse insulating barriers 10 (illustrated only in FIG. 3) disposed vertically above each of the ribs 2, resting on the upper surface of the partitions 6 and of the electrodes, and extending across the width of the electrolyte chamber 1.

The ribs, partitions and barriers, together constitute septa dividing the electrolyte chamber transversely into separate unit cells. Current may be passed along the chamber through each cell, passing from each pair of joined metal sheets through the electrolyte to the subsequent laterally adjacent pairs of metal sheets, which conduct it to the next subsequent unit cell. The arrangement ensures that all anodic surfaces are of platinised titanium and all cathodic surfaces of iron. The partitions and shelves may be constructed of polytetrafluoroethylene.

This form of apparatus has many advantages in respect of compactness and ease of servicing. While each septum may be a single continuous member, of which the ribs, barriers and partitions are parts, it is preferred that the ribs, barriers and partitions be separate members, thus giving an apparatus which is easily dismantled.

By supporting the electrodes clear of the bottom of the tank the ribs enable the electrolyte solution to circulate freely within each unit cell. This circulation is promoted by the action of cell itself, the uprush of bubbles between the electrodes carrying the electrolyte upwards, giving a convection effect. Instead of raised ribs supporting the electrodes, the bottom of the tank may be provided with channels or pipes to permit circulation of electrolyte.

Our invention is explained by our discovery that, where nascent hydrogen is formed at a platinised titanium electrode, the porous platinum layer is penetrated by the hydrogen and the titanium rapidly attacked, causing separation of the platinum layer and corrosion of the titanium by hydride formation. Corrosion of this type does not occur with iron or copper.

We claim:

1. Apparatus for performing electrolytic processes wherein a corrosive oxidizing agent and nascent hydrogen are released at the anode and cathode respectively, which comprises an electrolyte chamber, a number of vertical, longitudinal, platinized titanium anode sheets, disposed in parallel longitudinal rows, similarly disposed cathode sheets constructed of a metal which is resistant to attack by nascent hydrogen and arranged alternately both end to end and side by side with respect to the platinized titanium sheets, electrically conductive joints whereby each anode sheet is joined to the next preceding cathode sheet in the same row at their abutting edges, electric insulating partitions separating each cathode sheet from the next preceding anode sheet in the same row, the said insulating partitions having lateral faces bearing against the joined ends of laterally adjacent sheets thereby enclosing the joined ends in a substantially water-tight seal and together constituting transverse septa dividing the tank into a number of unit cells.

2. Apparatus according to claim 1 which comprises an electrolyte chamber, a number of equally spaced parallel transverse ribs extending across the bottom and said electrolyte chamber a number of vertical longitudinal iron sheets supported at their lower corners upon the said ribs, and a number of similarly supported vertical longitudinal platinised titanium sheets, which iron and platinised titanium sheets are arranged alternatively both end-to-end and side-by-side to form parallel longitudinal rows, electrically conductive joints whereby every platinised titanium sheet is joined to the next preceding iron sheet in the same row at their abutting edges, electrically insulating partitions separating each iron sheet from the next preceding platinised titanium sheet in the same row, the said insulating partitions having lateral faces bearing against the joined ends of laterally adjacent sheets thereby enclosing the joined ends in a substantially watertight seal, the partitions and ribs together constituting transverse septa which divide the tank into a number of unit cells.

3. Apparatus according to claim 2 wherein each insulating partition is provided with vertical slots into which the unjoined ends of the sheets separated only by that partition fit.

4. Apparatus according to claim 3 wherein those platinised titanium sheets which are the first members of a row and those iron sheets which are the last members of a row are electrically connected to respective copper bus bars.

5. Apparatus according to claim 3 wherein each platinised titanium sheet which is not the first member of a row is joined to the next preceding iron sheet in the same row at their abutting edges by a solder which comprises silver.

6. Apparatus according to claim 3 wherein transverse insulating barriers are disposed vertically above the transverse ribs, the said barriers resting on the upper surfaces of the partitions and the ends of the sheets, thereby extending the septa vertically upwards.

7. Apparatus according to claim 6 wherein the ribs, partitions and barriers are constructed of polytetrafluoroethylene.

References Cited

UNITED STATES PATENTS

| | | | |
|---|---|---|---|
| 2,799,643 | 7/1957 | Raelzsch | 204—270 |
| 3,022,244 | 2/1962 | Le Blanc et al. | 204—266 |
| 3,055,821 | 9/1962 | Holmes et al. | 204—270 |
| 3,291,714 | 12/1966 | Hall et al. | |

FOREIGN PATENTS

| | | |
|---|---|---|
| 947,230 | 6/1949 | France. |
| 4,681 | 11/1895 | Norway. |
| 616,029 | 3/1961 | Canada. |

JOHN H. MACK, *Primary Examiner.*

D. ROBERT JORDAN, *Assistant Examiner.*